United States Patent
Tang et al.

(10) Patent No.: US 10,833,536 B2
(45) Date of Patent: Nov. 10, 2020

(54) MAGNETIC COUPLER FOR WIRELESS POWER TRANSFER

(71) Applicant: AitronX Inc., Fremont, CA (US)

(72) Inventors: Xinlu Tang, Fremont, CA (US); Jiangwei Li, Fremont, CA (US)

(73) Assignee: AitronX Inc., Saratoga, CA (US)

(*) Notice: Subject to any disclaimer, the term of this patent is extended or adjusted under 35 U.S.C. 154(b) by 31 days.

(21) Appl. No.: 16/264,143

(22) Filed: Jan. 31, 2019

(65) Prior Publication Data
US 2019/0260233 A1   Aug. 22, 2019

Related U.S. Application Data

(60) Provisional application No. 62/633,876, filed on Feb. 22, 2018.

(51) Int. Cl.
| | |
|---|---|
| H02J 50/12 | (2016.01) |
| H02J 7/02 | (2016.01) |
| H01F 27/28 | (2006.01) |
| H01F 27/24 | (2006.01) |
| H01F 38/14 | (2006.01) |
| H01F 27/38 | (2006.01) |
| H01F 27/36 | (2006.01) |

(52) U.S. Cl.
CPC .............. *H02J 50/12* (2016.02); *H01F 27/24* (2013.01); *H01F 27/2823* (2013.01); *H01F 27/36* (2013.01); *H01F 27/38* (2013.01); *H01F 38/14* (2013.01); *H02J 7/025* (2013.01)

(58) Field of Classification Search
None
See application file for complete search history.

(56) References Cited

U.S. PATENT DOCUMENTS

| | | | |
|---|---|---|---|
| 2013/0015718 A1* | 1/2013 | Jung | H02J 50/70 307/104 |
| 2017/0222490 A1* | 8/2017 | Boys | H01F 27/2804 |
| 2018/0254142 A1* | 9/2018 | Jeong | H01F 27/42 |

FOREIGN PATENT DOCUMENTS

CN   105429315 B   * 12/2017

* cited by examiner

*Primary Examiner* — Jared Fureman
*Assistant Examiner* — Emmanuel Dominique
(74) *Attorney, Agent, or Firm* — Young Basile Hanlon & MacFarlane, P.C.

(57) ABSTRACT

A transmitter for a magnetic coupler includes a plate made of a magnetic material. A first coil and a second coil are arranged on a surface of the plate. The first coil and the second coil are disposed within a periphery of the surface of the plate. A first portion of the first coil overlaps a first portion of the second coil. The transmitter emits a magnetic field.

16 Claims, 4 Drawing Sheets

MAGNETIC COUPLER FOR WIRELESS POWER TRANSFER

CROSS-REFERENCE TO RELATED APPLICATION

This application claims priority to U.S. Provisional Patent Application No. 62/633,876, filed Feb. 22, 2018, which is incorporated herein in its entirety by reference.

TECHNICAL FIELD

This disclosure relates to wireless power transfer, and more particularly, to magnetic couplers for wireless power transfer.

BACKGROUND

Electric vehicles are developed to decrease dependence on fossil fuels. To recharge an electric vehicle, wired or wireless charging solutions can be used. Wireless charging is becoming popular due to its space-saving abilities and lower maintenance costs.

Wireless chargers often use magnetic couplers to transfer energy wirelessly. A magnetic coupler includes a transmitter and a receiver. The transmitter and receiver can include coils for transmitting energy through a resonating electromagnetic (EM) field. Typical winding configurations of the coils in the transmitter and/or the receiver can include concentric, double D (DD), and double-D quadrature (DDQ).

Due to the high amount of energy required by vehicles, wireless charging faces challenges of low coupling efficiency, high EM radiation leak (often referred to as "EM emission"), and limited charging distances. Additionally, onboard wireless battery chargers installed in a vehicle often have size limitations.

SUMMARY

One aspect of this disclosure is a transmitter for a magnetic coupler, comprising a plate made of a magnetic material and a first coil and a second coil arranged on a surface of the plate. The first coil and the second coil are disposed within a periphery of the surface of the plate. A first portion of the first coil overlaps a first portion of the second coil. The transmitter emits a magnetic field.

Another aspect of this disclosure is a magnetic coupler, comprising a transmitter for emitting a magnetic field. The transmitter comprises a first plate made of a magnetic material and a first primary coil and a second primary coil arranged on a surface of the first plate. The first primary coil and the second primary coil are disposed within a periphery of the surface. A first portion of the first primary coil overlaps a first portion of the second primary coil. The magnetic coupler further comprises a receiver for receiving the magnetic field. The receiver comprises a second plate made of the magnetic material and a first secondary coil arranged on a surface of the second plate. The first secondary coil is disposed within a periphery of the surface of the second plate. The magnetic field is between the surface of the first plate and the surface of the second plate.

Another aspect of this disclosure is a magnetic coupler, comprising a transmitter for emitting a magnetic field. The transmitter comprises a first plate made of a magnetic material and primary coils arranged on a surface of the first plate. The primary coils are disposed within a periphery of the surface of the first plate. Each of the primary coils overlaps at least one portion of each of the other primary coils. Each of the primary coils is arranged at a different height with respect to the first plate. The magnetic coupler further comprises a receiver for receiving the magnetic field. The receiver comprises a second plate made of the magnetic material and a secondary coil arranged on a surface of the second plate. The secondary coil is disposed within a periphery of the surface of the second plate. The magnetic field is between the surface of the first plate and the surface of the second plate.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Unless otherwise noted, like numerals represent like elements within the drawing figures.

DETAILED DESCRIPTION

Figure 1:
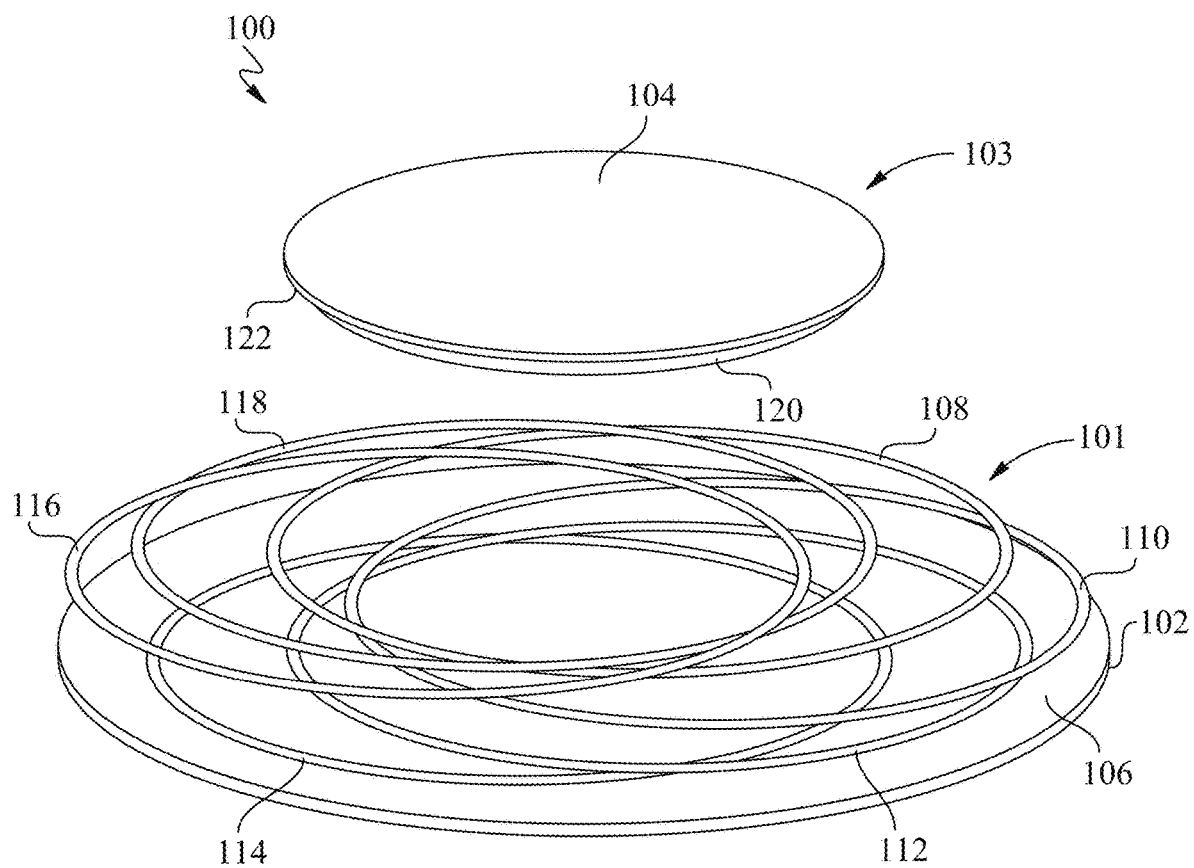
FIG. 1 is a perspective view of a magnetic coupler according to a first example.

A magnetic coupler is disclosed herein including a transmitter and a receiver. The magnetic coupler produces an electromagnetic (EM) field having a tapered profile that is transmitted between the transmitter and the receiver. Coils on the transmitter can be arranged in an interlacing manner to partially overlap with each other. Sizes and relative positions of the coils arranged on the transmitter can be adjusted to control and optimize the energy transfer efficiency between the transmitter and the receiver. According to implementations of this disclosure, the coils are interlaced within a small area on the transmitter and allow adaptive control and optimization of the EM field. This configuration allows the magnetic coupler to achieve high charging efficiency and low EM emission.

A wireless charging system, such as an onboard wireless charging system in a vehicle, can use the magnetic coupler to charge electric vehicles. The transmitter can be connected to a power supply including any AC or DC power source. The transmitter can transform electric power output from the power supply to the transmitter into a resonating current (e.g., by using an oscillator circuit), and excite a first set of coils ("primary coils") to generate a resonating EM field (e.g., a magnetic field). The transmitter can emit the resonating EM field to the receiver using the primary coils. The receiver can include a second set of coils ("secondary coils") to receive the resonating EM field. EM energy can be transferred by EM induction between the primary coils and the secondary coils. The energy carried by the resonating EM field can be transformed back to electricity by the receiver and output to power devices and/or charge batteries.

The transmitter and receiver can be made as pads, which may also be referred to as plates. For example, the transmitter can be made as a transmitter pad installed on the ground (e.g., in a garage or a parking stall) and can electrically connect to the power supply. The receiver can be made as a receiver pad in an onboard charger installed at the bottom (e.g., under the passenger compartment or the engine bay) of an electric vehicle. To charge the electric vehicle, the electric vehicle can be driven to align the receiver pad over the transmitter pad. The alignment can be measured by sensors and indicated by an output device (e.g., an onboard display or an audio speaker). When the transmitter and the receiver are aligned, the wireless charging system can start the charging process by using the transmitter to emit the EM field. When the electric vehicle is charged, a controller of the wireless charging system can receive a signal indicating the same, and the charging process can be stopped.

Optimizing and flexibly controlling the EM field and small-area coils increases the coupling efficiency and reduces EM radiation leak between the transmitter and the receiver. For example, the magnetic coupler can be designed using a coil arrangement to optimize shape and distribution of the EM field and reduce its overall size.

FIG. 1 is a perspective view of a magnetic coupler 100 according to a first example. In the illustrated, non-limiting example, the magnetic coupler 100 includes a transmitter 101 having a plate 102 (also referred to as a first plate or a transmitter plate) and a receiver 103 having a plate 104 (also referred to as a second plate or a receiver plate). The transmitter 101 emits a magnetic field and the receiver 103 receives the magnetic field.

The transmitter plate 102 can be a round plate made of any magnetic material (e.g., ferrite materials) or any combination of magnetic materials. The magnetic materials can have large permeability (e.g., greater than air), which can assist to concentrate the magnetic field for controlling its intensity and shape, allowing increased power transfer efficiency and reduced EM emission. It should be noted that the transmitter plate 102 can be of any size and any shape and is not limited to the shown examples.

The transmitter 101 can include one or more coils (also referred to as primary coils) arranged on a surface 106 of the transmitter plate 102. The transmitter plate 102 may operate as a magnetic shield with respect to the magnetic field between the transmitter 101 and the receiver 103. In the illustrated, non-limiting example, six primary coils 108-118 are arranged to partially overlap with each other in an interlacing manner. It should be noted that the number of the primary coils can be any number (e.g., 4, 8, 10, 12, etc.), and is not limited to the shown examples. The primary coils 108-118 can have a smaller size than the transmitter plate 102. Each of the primary coils 108-118 can be disposed within a periphery of the surface 106 of the transmitter plate 102. The primary coils 108-118 shown in FIG. 1 are round but may have any other shape.

Each of the primary coils 108-118 can be arranged at a different height with respect to the transmitter plate 102. The relative heights between the primary coils 108-118 can be equal or not equal. Each of the primary coils 108-118 can include multiple windings of wires. The primary coils 108-118 can connect to a power supply (not shown) in a series connection, a parallel connection, or any configuration of connection for individual or collective excitation. The primary coils 108-118 can connect to the power supply through lead wires.

It should be noted that the number, size, shape, and relative positions of the primary coils 108-118 can be optimized based on various factors, such as characteristics of the magnetic field (described below with respect to FIG. 4), operation conditions of the magnetic coupler 100, and installation of the wireless charging system that may include the magnetic coupler 100.

Figure 2:
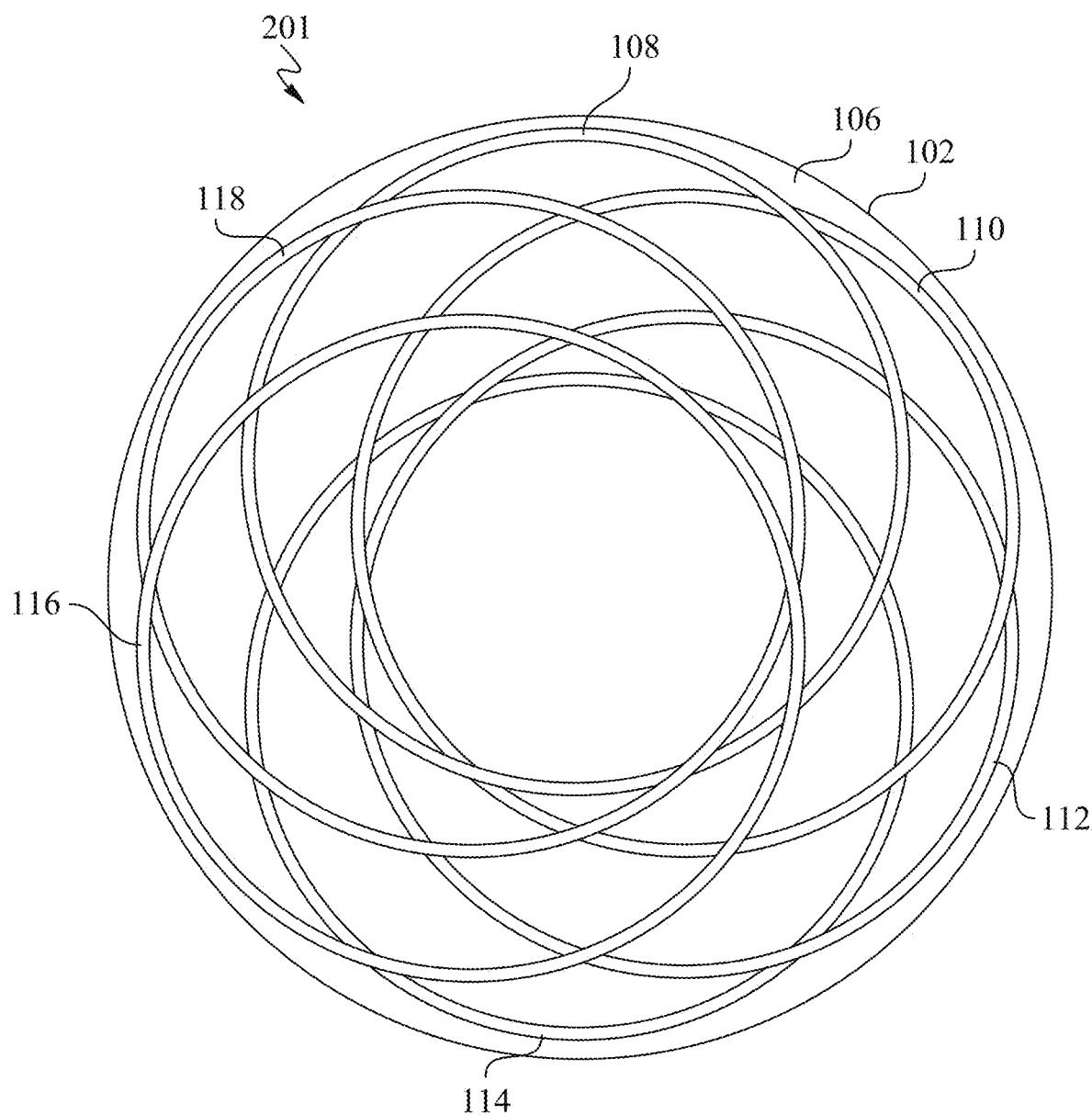
FIG. 2 is a top view of a transmitter according to a first example.

FIG. 2 is a top view of a transmitter 201 according to a first example. The transmitter 201 may include features similar to those of the transmitter 101 except as otherwise described. In the illustrated, non-limiting example, the primary coils 108-118 are symmetrically arranged with respect to the transmitter plate 102. Each of the primary coils 108-118 can overlap at least one portion of each of the other primary coils. In implementations where the primary coils 108-118 and the transmitter plate 102 are round, the primary coils 108-118 can be equidistantly and equiangularly arranged with respect to a center of the transmitter plate 102. For example, the center of each of the primary coils 108-118 can be equidistantly positioned (i.e., on a circle) with respect to the center of the transmitter plate 102. The centers of the primary coils 108-118 can also be symmetrically positioned on the circle, such as at angles of 0°, 60°, 120°, 180°, 240°, or 300°, respectively. The primary coils 108-118 can be arranged on the surface 106 of the transmitter plate 102 such that the primary coils 108-118 are central-symmetric relative to the center of the transmitter plate 102. If the arrangement of the primary coils 108-118 is symmetric about a point (e.g., the center of the transmitter plate 102), the arrangement can be referred to as point-symmetric or central-symmetric.

The primary coils 108-118 can be divided into groups, and the groups can be arranged in point symmetry while individual primary coils in each group are not. It should be noted that the primary coils 108-118 of the transmitter 201 can be arranged asymmetrically (e.g., the centers of the primary coils 108-118 are not equidistantly or equiangularly positioned with respect to the center of the transmitter plate 102). For example, due to irregular shapes, sizes, or positions of other components of the transmitter 201, the centers of the primary coils 108-118 can be adjusted off the positions shown in FIG. 2. To control the shape and distribution of the EM field emitted by the transmitter 201, the size, shape, and relative position of at least one of the primary coils 108-118 can be adjusted.

In the illustrated, non-limiting example, the transmitter 201 includes at least a first coil 108 and a second coil 110 arranged on the surface 106 of the transmitter plate 102. A first portion of the first coil 108 can overlap a first portion of the second coil 110. A second portion of the first coil 108 can overlap a second portion of the second coil 110 such that the first portion of the first coil 108 is located opposite the second portion of the first coil 108. The transmitter 201 can also include a third coil 112 that can be disposed within the periphery of the surface 106 of the transmitter plate 102. A portion of the third coil 112 can overlap with at least one of a portion of the first coil 108 or a portion of the second coil 110. In some implementations, a third portion of the first coil 108 overlaps with a first portion of the third coil 112. A fourth portion of the first coil 108 can overlap with a second portion of the third coil 112. The third portion of the first coil 108 can be opposite the fourth portion of the first coil 108. Additionally, a third portion of the second coil 110 can overlap with a third portion of the third coil 112. A fourth portion of the second coil 110 can overlap with a fourth portion of the third coil 112. The third portion of the second coil 110 can be opposite the fourth portion of the second coil 110.

The sizes of the first coil 108, the second coil 110, and the third coil 112 can be smaller than a size of the transmitter plate 102. The first coil 108, the second coil 110, and the third coil 112 can be arranged within a periphery of the surface 106 of the transmitter plate 102. The first coil 108 can be disposed at a different height with respect to the transmitter plate 102 than the second coil 110 and/or the third coil 112.

A center of the first coil 108, a center of the second coil 110, and a center of the third coil 112 can be located on a circle (not shown) centered at a center of the transmitter plate 102. The center of the first coil 108, the center of the second coil 110, and the center of the third coil 112 can be spaced apart from each other on the circle by equal angles.

Referring back to FIG. 1, the receiver plate 104 can be made of a magnetic material and may operate as a magnetic shield with respect to the magnetic field between the transmitter 101 and the receiver 103. The receiver plate 104 may or may not be made of the same materials as the transmitter plate 102. The receiver plate 104 can be round or have any other shape. In the illustrated, non-limiting example, the receiver plate 104 is smaller than the transmitter plate 102 but can be of any size. It should be noted that the size and shape of the receiver plate 104 can be determined depending on various factors (e.g., installation space and configuration of other components of the onboard charger) and are not limited to the shown examples.

The receiver 103 can include a coil 120 (also referred to as a secondary coil) arranged on a surface 122 of the receiver plate 104. A size of the secondary coil 120 can be smaller than the size of the receiver plate 104. The secondary coil 120 can be arranged within a periphery of the surface 122 of the receiver plate 104. In some implementations, more than one secondary coil can be arranged on the surface 122 of the receiver plate 104. It should be noted that any of the previously described arrangements of primary coils 108-118 can be used with respect to the secondary coils. For example, the receiver 103 can include a first secondary coil and a second secondary coil arranged on the surface 122 of the receiver plate 104. A first portion of the first secondary coil can overlap a first portion of the second secondary coil. The number, size, shape, and relative positions of the secondary coils can be optimized based on factors previously discussed with respect to the primary coils.

The receiver 103 can be installed in any device that receives energy. For example, the receiver 103 can be installed in a vehicle (e.g., an electric vehicle or hybrid vehicle), such as in or under a vehicle chassis. As long as the secondary coil 120 is inducted in the magnetic field emitted by the primary coils 108-118 of the powered transmitter 101 or 201, the receiver 103 can receive the EM energy carried by the EM waves of the resonating magnetic field and transform the EM energy into electric energy for output, such as a direct current (DC). For example, if the receiver 103 is installed in the chassis of a vehicle and connected to energy storage (e.g., batteries) of the vehicle, the vehicle can be wirelessly charged when the vehicle is driven to a position such that the receiver 103 is above the transmitter 101 or 201.

The EM field (e.g. magnetic field) for energy transfer is between the transmitter plate 102 and the receiver plate 104. The EM field can be controlled to have a tapering profile similar to a truncated cone or a pyramid shape. By changing the sizes and relative positions of the primary and/or secondary coils, the shape and distribution of the EM field can be controlled.

In some implementations, one or more magnetic cores (e.g., a magnetic core plate) can be placed inside the coils (e.g., the primary coils of the transmitter and/or the secondary coils of the receiver) to improve the coupling efficiency of the transmitter and the receiver. The magnetic core plate can have high magnetic permeability. In some implementations, multiple magnetic cores can be placed inside respective coils, with each of the coils having one magnetic core (not shown). The primary and/or secondary coils can be configured to wind around a magnetic core. In some implementations, the magnetic core may only be included in the receiver (e.g., the receiver 103).

Figure 3:
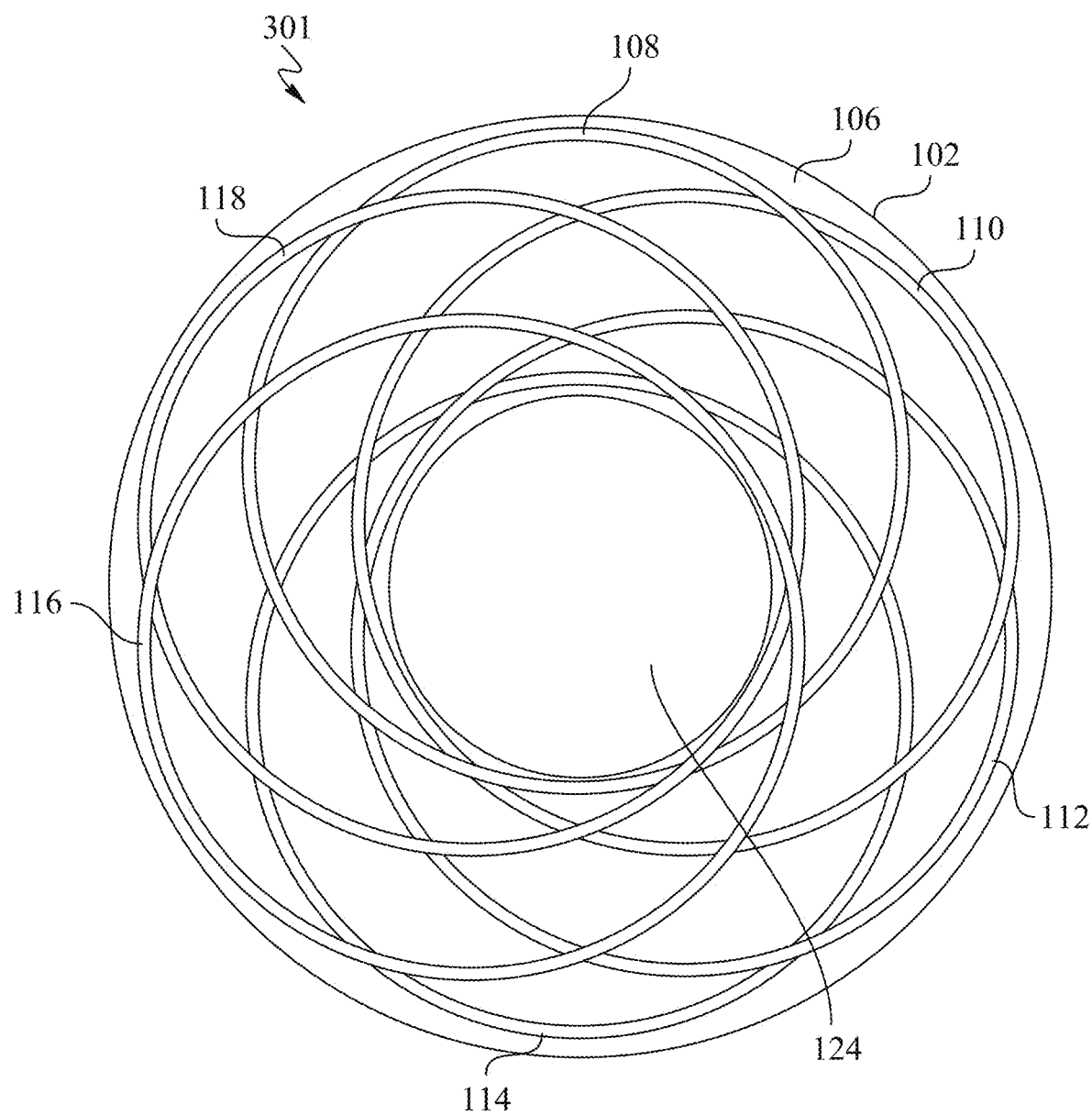
FIG. 3 is a top view of a transmitter according to a second example including a magnetic core plate.

FIG. 3 is a top view of a transmitter 301 according to a second example including a magnetic core plate 124. The transmitter 301 may include features similar to those of transmitters 101 and/or 201 except as otherwise described. The transmitter 301 includes the magnetic core plate 124 having a round shape and placed inside the primary coils 108-118. The magnetic core plate 124 can be positioned inside a periphery of the first primary coil 108, the second primary coil 110, the third primary coil 112, and each of the other primary coils 114-118. In other implementations, the transmitter 301 can include multiple magnetic core plates and each primary coil 108-118 can have a magnetic core plate positioned inside the periphery of the primary coil. For example, a first magnetic core plate can be positioned inside the periphery of the first coil 108 and a second magnetic core plate can be positioned inside the periphery of the second coil 110.

Referring back to FIG. 1, the receiver 103 can include a second magnetic core plate (not shown) positioned relative to one or more secondary coils in the same way described with respect to the magnetic core plate 124 and primary coils 108-118 of the transmitter 301. For example, the second magnetic core plate can be positioned inside a periphery of the secondary coil 120. In implementations where the receiver 103 includes multiple secondary coils, the second magnetic core plate can be positioned inside the periphery of each of the secondary coils. The receiver 103 may include multiple magnetic core plates and each of the secondary coils can have a magnetic core plate positioned inside the periphery of the secondary coil.

Figure 4:
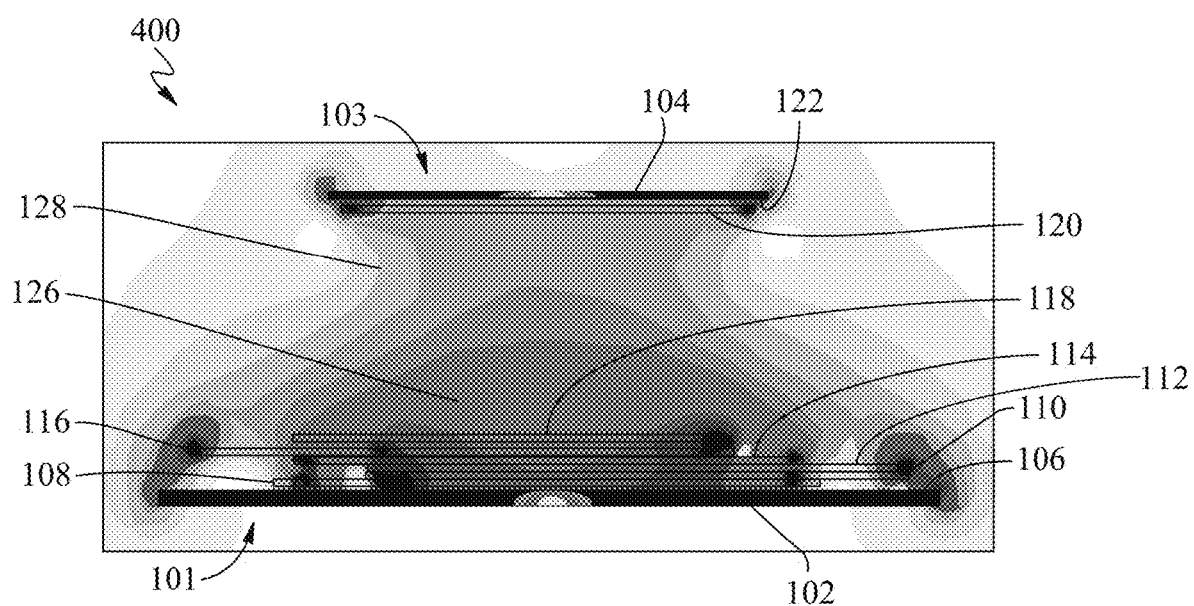
FIG. 4 is a cross-sectional view of a magnetic field generated by a magnetic coupler according to a second example.

FIG. 4 is a cross-sectional view of a magnetic field 126 generated by a magnetic coupler 400 according to a second example. The magnetic coupler 400 may include features similar to those of magnetic coupler 100 except as otherwise described. In the illustrated, non-limiting example, the magnetic coupler 400 includes the transmitter 101 having the transmitter plate 102 and six primary coils 108-118 arranged in an interlacing pattern on the surface 106 of the transmitter plate 102. The magnetic coupler 400 includes the receiver 103 having the receiver plate 104 and the secondary coil 120 arranged on the surface 122 of the receiver plate 104.

The shading of the magnetic field 126 illustrates the distribution of the magnetic field strength. Darker shading represents higher magnetic field strength, and lighter shading represents a lower magnetic field strength. The shape of the cross-section of the magnetic field 126 can be similar to a trapezoid shape with a neck 128. The magnetic field 126 can have a tapering profile similar to a truncated cone or a pyramid (e.g., a circular truncated cone or a round pyramid if the transmitter plate 102 and receiver plate 104 are round plates). The profile of the magnetic field 126 can taper in a direction away from the surface 106 of the transmitter plate 102, or towards the receiver 103. The field strength distribution of the magnetic field 126 can be higher in the center of the magnetic field and lower in the periphery of the magnetic field. The magnetic coupler 400 can be configured and optimized (e.g., by adjusting the sizes and relative positions of the primary and secondary coils) to generate the magnetic field 126 with the truncated-cone profile.

As shown in FIG. 4, the receiver plate 104 can be smaller than the transmitter plate 102, and an EM-excited area of the transmitter 101 can be larger than an EM-excited area of the receiver 103. This design allows for generation and control of the magnetic field 126 having a tapered profile. The tapering profile of the magnetic field 126 allows the magnetic coupler 400 to have a higher magnetic coupling coefficient and therefore have a longer effective charging distance between the transmitter 101 and the receiver 103. In addition, due to the small size of the primary and secondary coils, the magnetic coupler 400 can have a reduced overall size and reduced EM emissions.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this disclosure, the term "or" is intended to mean an inclusive "or" rather than an exclusive "or" for two or more elements it conjoins. That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. The term "and/or" used in this disclosure is intended to mean an "and" or an inclusive "or." That is, unless specified otherwise, or clear from context, "X includes A, B, and/or C" is intended to mean X can include any combinations of A, B, and C. In other words, if X includes A; X includes B; X includes C; X includes both A and B; X includes both B and C; X includes both A and C; or X includes all A, B, and C, then "X includes A and/or B" is satisfied under any of the foregoing instances. Similarly, "X includes at least one of A, B, and C" is intended to be used as an equivalent of "X includes A, B, and/or C." In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

It should be understood that although this disclosure uses terms such as first, second, third, etc., the disclosure should not be limited to these terms. These terms are used only to distinguish similar types of information from each other. For example, without departing from the scope of this disclosure, a first information can also be referred to as a second information; and similarly, a second information can also be referred to as a first information. Depending on the context, the words "if" as used herein can be interpreted as "when," "while," or "in response to."

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A transmitter for a magnetic coupler, comprising:
   a plate made of a magnetic material; and
   a first coil and a second coil arranged on a surface of the plate, wherein the first coil and the second coil are disposed within a periphery of the surface of the plate, wherein a first portion of the first coil overlaps a first portion of the second coil; and
   a third coil, wherein a portion of the third coil overlaps with at least one of a second portion of the first coil or a second portion of the second coil, and wherein the third coil is disposed within the periphery of the surface of the plate;
   wherein the plate, the first coil, the second coil, and the third coil are round;
   a center of the first coil, a center of the second coil, and a center of the third coil are located on a circle centered at a center of the plate;
   the center of the first coil, the center of the second coil, and the center of the third coil are spaced apart from each other on the circle by equal angles; and
   the transmitter emits a magnetic field, and the first coil, the second coil, and the third coil are configured to generate magnetic flux in the same direction.

2. The transmitter of claim 1, wherein the first coil and the second coil include multiple windings of wires.

3. The transmitter of claim 1, further comprising:
   a magnetic core plate positioned inside the periphery of the first coil and inside the periphery of the second coil.

4. The transmitter of claim 1, further comprising a first magnetic core plate positioned inside the periphery of the first coil and a second magnetic core plate positioned inside the periphery of the second coil.

5. The transmitter of claim 1, wherein a second portion of the first coil overlaps a second portion of the second coil, wherein the first portion of the first coil is located opposite the second portion of the first coil.

6. The transmitter of claim 5, further comprising:
   a third coil disposed within the periphery of the surface of the plate, wherein:
   a third portion of the first coil overlaps with a first portion of the third coil;
   a fourth portion of the first coil overlaps with a second portion of the third coil;

a third portion of the second coil overlaps with a third portion of the third coil; and a fourth portion of the second coil overlaps with a fourth portion of the third coil.

7. The transmitter of claim 1, wherein a profile of the magnetic field tapers in a direction away from the surface of the plate.

8. The transmitter of claim 1, wherein the first coil is arranged at a different height with respect to the plate than the second coil.

9. The transmitter of claim 1, wherein the magnetic field of the transmitter has a circular truncated cone profile.

10. A magnetic coupler, comprising:
   a transmitter for emitting a magnetic field, comprising:
      a first plate made of a magnetic material;
      a first primary coil and a second primary coil arranged on a surface of the first plate, wherein the first primary coil and the second primary coil are disposed within a periphery of the surface, and wherein a first portion of the first primary coil overlaps a first portion of the second primary coil; and
      a third primary coil, wherein a portion of the third primary coil overlaps with at least one of a second portion of the first primary coil or a second portion of the second primary coil, and wherein the third primary coil is disposed within the periphery of the surface of the plate;
      wherein the plate, the first primary coil, the second primary coil, and the third primary coil are round;
      a center of the first primary coil, a center of the second primary coil, and a center of the third primary coil are located on a circle centered at a center of the plate;
      the center of the first primary coil, the center of the second primary coil, and the center of the third primary coil are spaced apart from each other on the circle by equal angles; and
      the first primary coil, the second coil, and the third primary coil are configured to generate magnetic flux in the same direction; and
   a receiver for receiving the magnetic field, comprising:
      a second plate made of a magnetic material; and
      a first secondary coil arranged on a surface of the second plate, wherein the first secondary coil is disposed within a periphery of the surface of the second plate, and wherein the magnetic field is between the surface of the first plate and the surface of the second plate.

11. The magnetic coupler of claim 10, wherein a profile of the magnetic field tapers towards the receiver.

12. The magnetic coupler of claim 10, wherein the transmitter further comprises a first magnetic core plate positioned inside a periphery of the first primary coil, inside a periphery of the second primary coil, and inside a periphery of the third primary coil.

13. The magnetic coupler of claim 10, wherein the receiver further comprises a magnetic core plate positioned inside a periphery of the first secondary coil.

14. The magnetic coupler of claim 10, wherein the receiver further includes a second secondary coil, wherein a first portion of the first secondary coil overlaps a first portion of the second secondary coil.

15. A magnetic coupler, comprising:
   a transmitter for emitting a magnetic field, comprising:
      a first plate made of a magnetic material;
      primary coils arranged on a surface of the first plate, wherein the primary coils are disposed within a periphery of the surface of the first plate, wherein each of the primary coils overlaps at least one portion of each of the other primary coils, and wherein each of the primary coils is arranged at a different height with respect to the first plate; and
      wherein the plate and the primary coils are round;
      a center of each of the primary coils is located on a circle centered at a center of the plate;
      the center of each of the primary coils is spaced apart from the centers of a preceding primary coil and a succeeding primary coil on the circle by equal angles; and
      the primary coils are configured to generate magnetic flux in the same direction; and
   a receiver for receiving the magnetic field, comprising:
      a second plate made of the magnetic material; and
      a secondary coil arranged on a surface of the second plate, wherein the secondary coil is disposed within a periphery of the surface of the second plate, and wherein the magnetic field is between the surface of the first plate and the surface of the second plate.

16. The magnetic coupler of claim 15, wherein a profile of the magnetic field tapers towards the receiver.

* * * * *